United States Patent [19]

Swales

[11] Patent Number: 4,603,746
[45] Date of Patent: Aug. 5, 1986

[54] DISK BLADE SCRAPER

[76] Inventor: Barton L. Swales, 1708 E. Fourth St., Coal Valley, Ill. 61240

[21] Appl. No.: 632,481

[22] Filed: Jul. 19, 1984

[51] Int. Cl.[4] ............................................. A01B 23/06
[52] U.S. Cl. .................................. 172/559; 15/256.5; 172/560; 111/88
[58] Field of Search ............... 172/558, 559, 560, 566; 111/88; 15/245, 256.5; 305/11; 301/63 PW, 37 CM, 37 P, 108 R, 108 A

[56] References Cited

U.S. PATENT DOCUMENTS

| 785,865 | 3/1905 | Davis | 172/559 |
|---|---|---|---|
| 808,021 | 12/1905 | Davis . | |
| 843,943 | 2/1907 | Hegland . | |
| 877,685 | 1/1908 | Warner . | |
| 954,653 | 4/1910 | Smith . | |
| 1,105,130 | 7/1914 | Gilpin et al. . | |
| 1,202,516 | 10/1916 | Harland . | |
| 1,204,306 | 11/1916 | Offerman | 172/560 |
| 2,187,443 | 1/1940 | Beamer . | |
| 2,497,224 | 2/1950 | Laure | 301/63 PW |
| 2,701,996 | 2/1955 | Wiese . | |
| 2,724,867 | 11/1955 | Smith | 301/63 PW X |
| 3,111,347 | 11/1963 | Miller | 301/108 R |
| 3,133,301 | 5/1964 | Helminen | 15/245 |
| 3,622,165 | 11/1971 | Hatch | 305/11 |
| 3,691,588 | 9/1972 | Hennig | 15/256.5 |
| 4,206,817 | 6/1980 | Bowerman . | |
| 4,328,888 | 5/1982 | Luke | 15/256.5 |
| 4,337,835 | 7/1982 | Steilen . | |

Primary Examiner—Richard J. Johnson
Attorney, Agent, or Firm—Henderson & Sturm

[57] ABSTRACT

The present invention provides a scraper mechanism for a disk blade including a wear ring attached to the rim of a rotary scraper and releasably biased toward and held in planar contact with one side of a disk blade. The wear ring is molded from a low friction, long-wearing material, such as molded nylon. The low friction material eliminates the metal to metal contact of conventional rotary scrapers and therefore eliminates the squeal associated with rotary scrapers. Also, wear of the scraper is audibly detected when the wear ring is worn away, thereby alerting the operator that maintenance is required.

22 Claims, 4 Drawing Figures

DISK BLADE SCRAPER

TECHNICAL FIELD

This invention relates to disk blade scrapers and more particularly to rotary scrapers.

BACKGROUND ART

Numerous scraper mechanisms have been used to prevent the accumulation of soil on disk blades. One such device that has been commercially successful is the rotary scraper disclosed in U.S. Pat. No, 4,206,817. This rotary scraper, however, includes a heat-treated metal rim that contacts the metal disk blade and emits an annoying characteristic squeal. Further, the metal rim, even though heat-treated, has a relatively short working life and when wear is excessive the entire scraper must be replaced.

Even though scrapers are not required when certain soil conditions exist, conventional scrapers are biased to contact the disk blade at all times, thus unnecessarily contributing to the problem of excessive wear.

Those concerned with these and other problems recognize the need for an improved scraper mechanism.

DISCLOSURE OF THE INVENTION

The present invention provides a scraper mechanism for a disk blade including a wear ring attached to the rim of a rotary scraper and biased toward and held in planar contact with one side of a disk blade. The wear ring is molded from a low friction, long wearing material, such as molded nylon. The low friction material eliminates the metal to metal contact of conventional rotary scrapers and therefore eliminates the squeal associated with rotary scrapers. Also, wear of the scraper is audibly detected when the wear ring is worn away, thereby alerting the operator that maintenance is required.

The present invention also provides a selectively releasable biasing structure that pivots the wear ring away from scraping contact with the disk blade when the scrapers are not required to prevent the accumulation of soil on the disk blades.

Use of the wear ring provides a low cost field replacement for rotary scrapers now on the market. Further, since metal to metal contact is eliminated, heat treating of the metal rims to enhance wear is no longer required thereby reducing manufacturing costs.

An object of the present invention is the provision of an improved disk blade scraper.

Another object is to provide a disk blade scraper that is easily used and maintained.

A further object of the invention is the provision of a rotary disk blade scraper that eliminates metal to metal contact in the scraping operation thereby eliminating the characteristic squeal of a rotary scraper.

Still another object is to provide a disk blade scraper that is inexpensive to manufacture.

A still further object of the present invention is the provision of a disk blade scraper having an inexpensive wear surface that is easily replaced.

Yet another object is to provide a disk blade scraper that is not prone to excessive wear.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
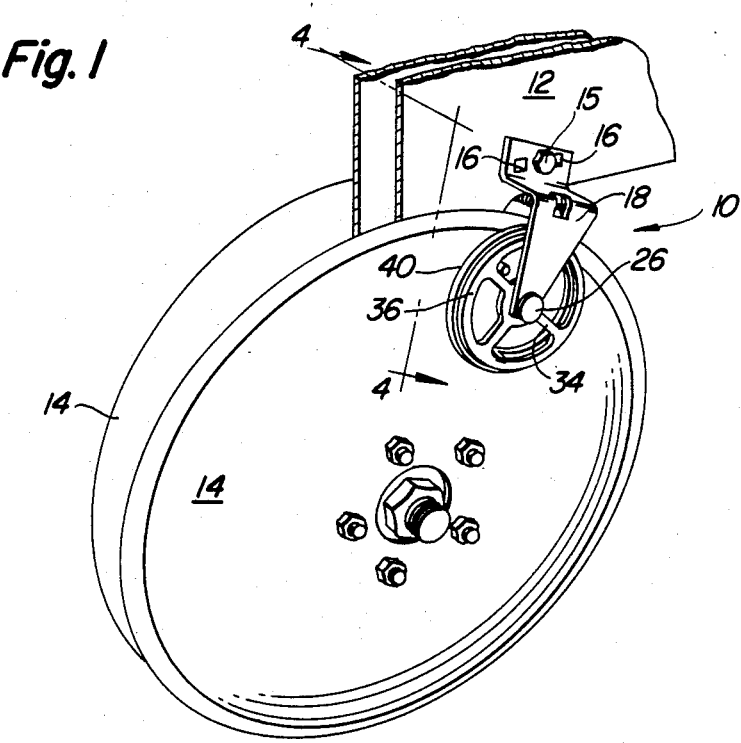
FIG. 1 is a perspective view showing the disk blade scraper of the present invention mounted to operably contact a portion of a conventional disk blade.

Referring now to the drawings, wherein like reference numerals designate identical or corresponding parts throughout the several views, FIG. 1 shows a scraper mechanism, generally designated by the reference numeral (10), mounted on and supported by a shank plate (12) of a conventional subframe (not shown). The scraper mechanism (10) is biased toward contact with a section of one side of a disk blade (14). Although the illustration of FIG. 1 shows the scraper mechanism (10) mounted to contact the convex side of the disk blade (14), it is to be understood that it could also be mounted to contact the concave side.

The scraper mechanism (10) includes a bracket arm (18) which is attached by a bolt (15) and locator tabs (16) to the shank plate (12). As described hereinafter, the scraper mechanism (10) is biased toward the disk blade (14) by the releasable biasing structure shown in FIG. 4.

Figure 2:
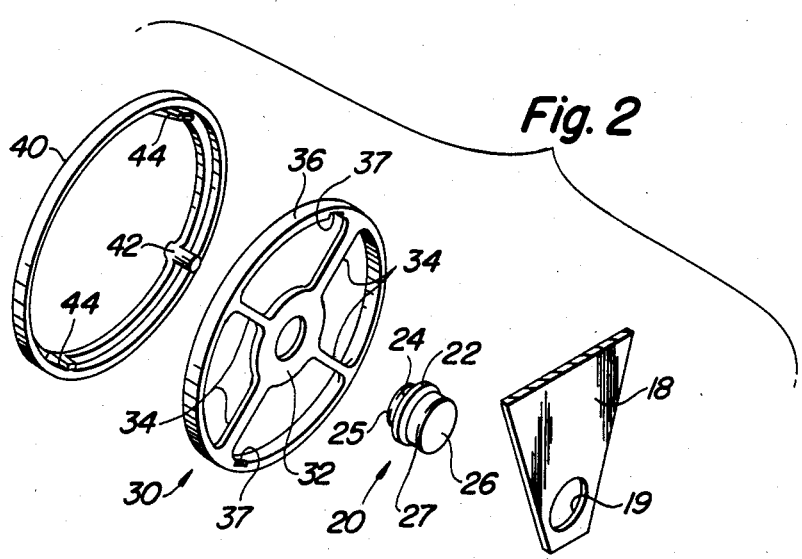
FIG. 2 is an enlarged exploded perspective view illustrating the components of the disk blade scraper.
Figure 3:
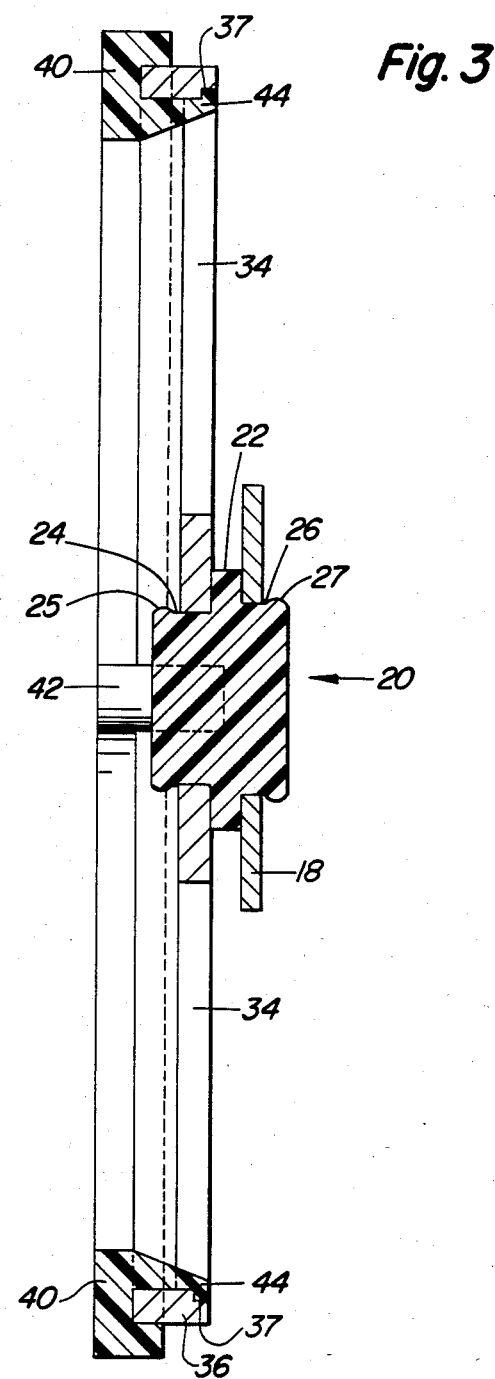
FIG. 3 is a greatly enlarged sectional view showing the orientation of the scraper components when assembled.

As most clearly shown in FIGS. 2 and 3, a molded bearing (20) interconnects the bracket arm (18) and a scraper (30). The bearing (20) includes an enlarged central flange (22) and first and second shafts (24) and (26) that extend axially outward in opposite directions from the flange (22). Enlarged lips (25) and (27) extend radially outward from the ends of the first and second shafts (24) and (26).

The scraper (30) includes a hub (32), a number of radially extending spokes (34), and a peripheral rim (36) supported by the spokes (34). A molded wear ring (40) matingly receives a portion of the peripheral rim (36) and includes a lug pin (42) that extends between adjacent spokes (34), and a pair of snap tabs (44) that frictionally engage the rim (36) and are received in notches (37). The positioning of the lug pin (42) insures that the wear ring (40) will rotate when the scraper (30) rotates.

When assembling the scraper mechanism (10), the bearing (20) is received in the hub (32) and in the aperture (19) of bracket arm (18), and the resilient radial lips (25) and (27) act to hold the scraper (30) and bracket arm (18) together (FIG. 3). The wear ring (40) is snapped onto the peripheral rim (36) and held in position by snap tabs (44). It is to be understood that the radial lips (25) and (27) and snap tabs (44) are used primarily for convenience in assembly, since the biasing force holds the components together when mounted to contact the disk blade (14).

Figure 4:
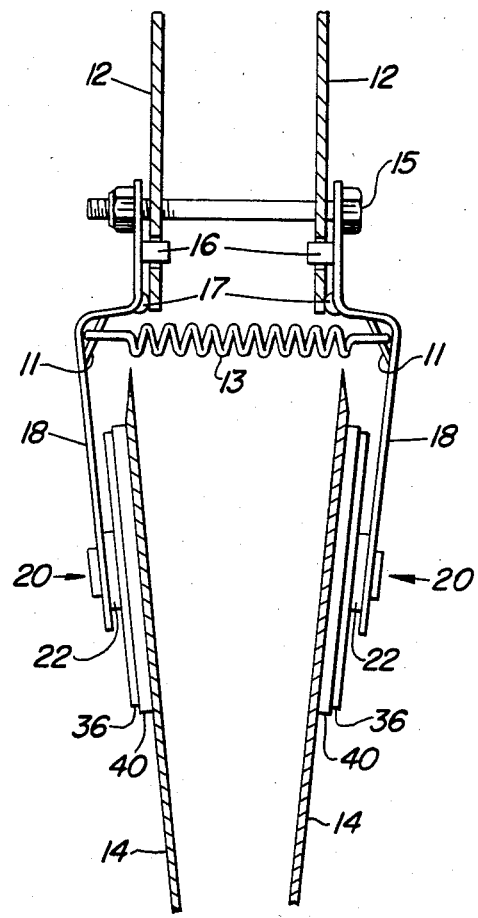
FIG. 4 is an enlarged sectional view taken along line 4—4 of FIG. 1, showing the releasable biasing structure.

When the scraper mechanism (10) is assembled, it is mounted on the shank plate (12) and the wear ring (40) is biased toward planar contact with the disk blade (14). FIG. 4 shows one embodiment of a selectively releasable biasing structure which is adapted for use in conjunction with a pair of opposing disk blades (14) such as those used in a planting unit furrow opener. Each bracket arm (18) includes an ear projection (17) disposed to contact the surface of the shank plate (12) and a loop (11) adapted to receive one end of a tension spring (13). The tension spring (13) biases each wear ring (40) into planar contact with its respective disk blade (14). When soil conditions are such that the scrapers are not required, bolt (15) is simply tightened to pivot the bracket arm (18) about ear (17) to overcome the force of spring (13) and move the wear rings (40) out of full scraping contact with the disk blades (14). When scrapers are again needed, bolt (15) is simply loosened and the force of spring (13) brings the wear rings (40) back into full scraping contact with the disk blades (14). The movement of the wear ring (40) is limited such that the wear ring (40) is at all times disposed between the rim (36) and the disk blade (14) without sufficient clearance to be removed. It is to be understood that the releasable biasing structure could be used in conjunction with a single disk blade (14) by attaching the tension spring (13) to an extension of the shank plate (12) or by providing a compression spring above the pivot point defined by the ear projection (17).

When the scraper mechanism (10) begins to wear, the operator simply removes bolt (15), replaces the wear ring (40), and retightens bolt (15). The wear ring (40) may be constructed of various materials including molded nylon. It is to be understood that a low friction, long-wearing material is preferred. When a low friction material is used, the characteristic squeal of the rotary scraper is not heard by the operator until the wear ring (40) needs to be replaced—thus, the squeal acts as an auditory signal that maintenance is required.

Therefore, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a scraper mechanism for a disk blade including means for supporting the scraper with respect to the disk blade, said scraper including a hub, a plurality of spokes extending radially from the hub, and a peripheral rim supported by the spokes, the improvement comprising:
    a wear ring releasably secured in contacting relationship with said rim, and disposed intermediate said rim and said disk blade, said wear ring being held in planar contact with one side of said disk blade.

2. The scraper mechanism of claim 1 further including a lug pin attached to and extending from said wear ring, said lug pin being disposed to extend between adjacent spokes.

3. The scraper mechanism of claim 1, further including a snap tab attached to and extending from said wear ring, said snap tab being disposed to contact and frictionally engage said rim.

4. The scraper mechanism of claim 1 wherein said supporting means includes a bracket arm having an aperture formed therein, and a bearing received within said aperture and disposed to interconnect said hub and said bracket arm.

5. The scraper mechanism of claim 4 wherein said bearing includes an enlarged central flange, a first shaft extending axially from one side of said flange and disposed to extend through said hub, and a second shaft extending axially from the other side of said flange and disposed to extend through said aperture in said bracket arm.

6. The scraper mechanism of claim 5 wherein said first shaft includes an enlarged lip disposed to contact and frictionally engage said hub.

7. The scraper mechanism of claim 5 wherein said second shaft includes an enlarged lip disposed to contact and frictionally engage said bracket arm.

8. The scraper mechanism of claim 1 wherein said wear ring is formed of molded nylon.

9. The scraper mechanism of claim 1, further including the means for biasing the scraper toward the disk blade, wherein said biasing means is selectively releasable.

10. In a rotary scraper mechanism for a disk blade including a plurality of spokes extending from a hub, and means for biasing the spokes toward the disk blade, the improvement comprising:
    a wear ring releasably secured in contacting relationship with said spokes, and disposed intermediate said spokes and said disk blade, said wear ring being held in planar contact with one side of said disk blade by said biasing means.

11. The scraper mechanism of claim 10, further including a lug pin attached to and extending from said wear ring, said lug pin being disposed to extend between adjacent spokes.

12. The scraper mechanism of claim 10, further including a snap tab attached to and extending from said wear ring, said snap tab being disposed to contact and frictionally engage one of said spokes.

13. The scraper mechanism of claim 10 wherein said biasing means includes a bracket arm having an aperture formed therein, and a bearing received within said aperture and disposed to interconnect said hub and said bracket arm.

14. The scraper mechanism of claim 13 wherein said bearing includes an enlarged central flange, a first shaft extending axially from one side of said flange and disposed to extend through said hub, and a second shaft extending axially from the other side of said flange and disposed to extend through said aperture in said bracket arm.

15. The scraper mechanism of claim 14 wherein said first shaft includes an enlarged lip disposed to contact and frictionally engage said hub.

16. The scraper mechanism of claim 14 wherein said second shaft includes an enlarged lip disposed to contact and frictionally engage said bracket arm.

17. The scraper mechanism of claim 10 wherein said wear ring is formed of molded nylon.

18. The scraper mechanism of claim 10 wherein said biasing means is selectively releasable.

19. The scraper mechanism of claim 10 further including:
    a bracket arm disposed intermediate a frame member and said scraper, said bracket arm including an ear projection disposed intermediate its ends to contact said frame member, wherein said biasing means is attached to said bracket arm and pivots said bracket arm about said ear projection toward a first position wherein said scraper is in full scraping contact with said disk blade; and
    means for pivoting said bracket arm about said ear projection toward a second position wherein said scraper is moved from full scraping contact with said disk blade.

20. The scraper mechanism of claim 19 wherein said pivoting means includes a threaded fastener disposed to interconnect said bracket arm and said frame member.

21. The scraper mechanism of claim 9 further including:
a bracket arm disposed intermediate a frame member and said scraper, said bracket arm including an ear projection disposed intermediate its ends to contact said frame member, wherein said biasing means is attached to said bracket arm and pivots said bracket arm about said ear projection toward a first position wherein said scraper is in full scraping contact with said disk blade; and means for pivoting said bracket arm about said ear projection toward a second position wherein said scraper is moved from full scraping contact with said disk blade.

22. The scraper mechanism of claim 21 wherein said pivoting means includes a threaded fastener disposed to interconnect said bracket arm and said frame member.

* * * * *

UNITED STATES PATENT AND TRADEMARK OFFICE
CERTIFICATE OF CORRECTION

PATENT NO. : 4,603,746

DATED : August 5, 1986

INVENTOR(S) : Barton L. Swales

It is certified that error appears in the above—identified patent and that said Letters Patent is hereby corrected as shown below:

On the title page insert:

Assignee: Deere & Company, Moline, Ill.

Signed and Sealed this

Twenty-eighth Day of October, 1986

[SEAL]

*Attest:*

DONALD J. QUIGG

*Attesting Officer*   *Commissioner of Patents and Trademarks*